(12) United States Patent
Schoenmaker

(10) Patent No.: US 8,122,571 B2
(45) Date of Patent: Feb. 28, 2012

(54) CLOSURE CLIP AND PROCESS FOR THE PRODUCTION THEREOF

(75) Inventor: Hans Schoenmaker, Dreieich (DE)

(73) Assignee: Poly-Clip System GmbH & Co. KG, Frankfurt am Main (DE)

( * ) Notice: Subject to any disclaimer, the term of this patent is extended or adjusted under 35 U.S.C. 154(b) by 1011 days.

(21) Appl. No.: 11/734,878

(22) Filed: Apr. 13, 2007

(65) Prior Publication Data

US 2007/0240380 A1    Oct. 18, 2007

(30) Foreign Application Priority Data

Apr. 13, 2006  (DE) .......................... 10 2006 017 537

(51) Int. Cl.
*B65D 33/16*    (2006.01)
(52) U.S. Cl. .................. 24/30.5 W; 24/30.5 R; 53/138.4
(58) Field of Classification Search .............. 24/30.5 W, 24/30.5 R, 115 A, 27, 20 R, 20 CW, 703.1, 24/703.2, 703.5, 703.6; 206/343, 340; 439/100; 53/138.4, 417; 29/243.56
See application file for complete search history.

(56) References Cited

U.S. PATENT DOCUMENTS 490,814 A * 1/1893 Shetty ........................ 229/78.2

659,634 A * 10/1900 Allen .......................... 229/78.1
(Continued)

FOREIGN PATENT DOCUMENTS

| DE | 953 778 | 12/1956 |
|----|---------|---------|
| DE | 1779 750 U | 12/1958 |
| EP | 0 081 250 | 6/1983 |
| SU | 320983 A1 | 11/1972 |

OTHER PUBLICATIONS

European Search Report for EP 07 007 136.0.
English Machine Translation for SU 320983.

*Primary Examiner* — Robert J Sandy
*Assistant Examiner* — Rowland D Do
(74) *Attorney, Agent, or Firm* — Hahn Loeser & Parks LLP

(57) ABSTRACT

Closure clips and a process for the production of closure clips of strip-form or wire-form material for the closure of tubular or bag-like packagings. In the process, a substantially waveform profile with successive first and second apex points is stamped along the strip-form or wire-form material, the first apex point forming a clip bottom, flanks respectively adjoining the first apex point on each side thereof form clip limbs that are bent over in a U-shape and the second apex point forms limb ends that are bent over outwardly with respect to the U-shape at which two adjacent closure clips are separably connected. The strip-form or wire-form closure clip material is pierced inwardly with respect to the U-shape so that a raised material portion is formed at the limb inside.

6 Claims, 2 Drawing Sheets

U.S. PATENT DOCUMENTS

Figure 4:
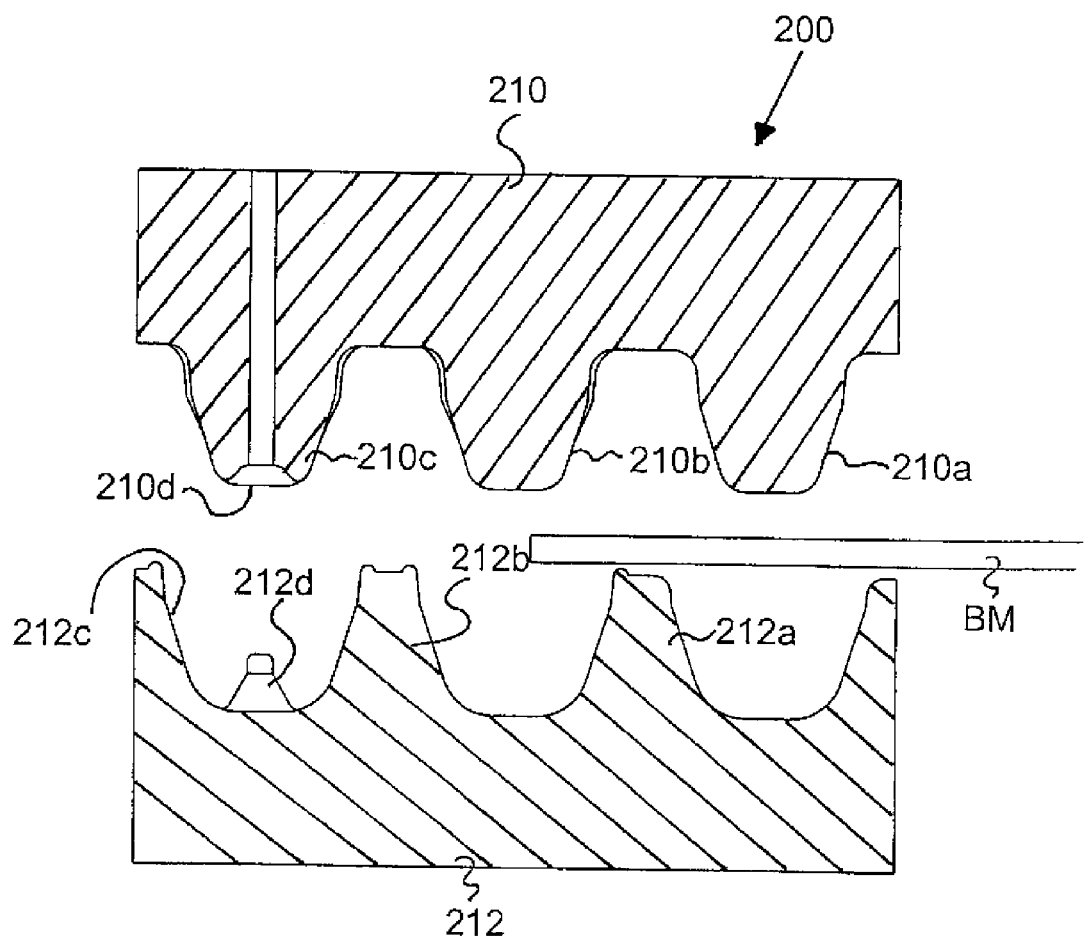

| | | | | |
|---|---|---|---|---|
| 903,756 A * | 11/1908 | McGill | ................. | 24/703.3 |
| 1,055,280 A * | 3/1913 | Klann | ................. | 24/703.5 |
| 1,427,866 A * | 9/1922 | Tevander | ................. | 24/28 |
| 1,933,035 A * | 10/1933 | Swift | ................. | 229/78.2 |
| 2,081,854 A * | 5/1937 | Doebler | ................. | 402/18 |
| 2,601,125 A * | 6/1952 | O'Connor | ................. | 402/79 |
| 2,855,647 A * | 10/1958 | Smith | ................. | 24/30.5 W |
| 3,503,119 A * | 3/1970 | Seitz, Jr. et al. | ................. | 29/509 |
| 3,864,790 A * | 2/1975 | Reinwall, Jr. | ................. | 24/129 R |
| 4,131,975 A * | 1/1979 | Niedecker | ................. | 24/30.5 W |
| 4,200,962 A | 5/1980 | Niedecker | | |
| 4,275,485 A * | 6/1981 | Hutchison | ................. | 24/30.5 R |
| 4,308,641 A * | 1/1982 | Niedecker | ................. | 24/30.5 W |
| 4,742,601 A * | 5/1988 | Furutsu | ................. | 24/30.5 R |
| 4,835,820 A * | 6/1989 | Robbins, III | ................. | 24/30.5 R |
| 5,008,980 A * | 4/1991 | Zimmermann | ................. | 24/30.5 R |
| 5,247,723 A * | 9/1993 | Niedecker | ................. | 24/30.5 W |
| 5,263,671 A * | 11/1993 | Baum | ................. | 248/68.1 |
| 5,546,637 A * | 8/1996 | Niedecker | ................. | 24/30.5 R |
| 5,735,022 A * | 4/1998 | Niedecker | ................. | 24/30.5 R |
| 5,852,850 A * | 12/1998 | Hanten et al. | ................. | 24/20 R |
| 5,953,794 A * | 9/1999 | Hanten et al. | ................. | 24/30.5 W |
| 6,058,572 A * | 5/2000 | Folkmar | ................. | 24/30.5 R |
| 7,571,518 B2 * | 8/2009 | Davidson | ................. | 24/30.5 L |

* cited by examiner

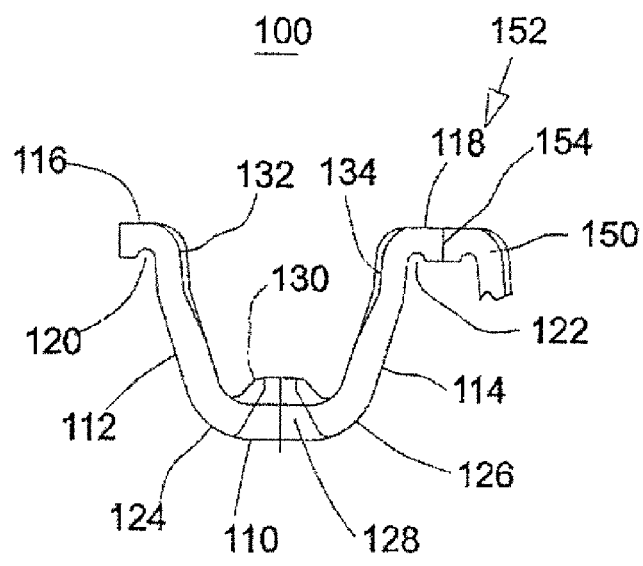
Fig. 1
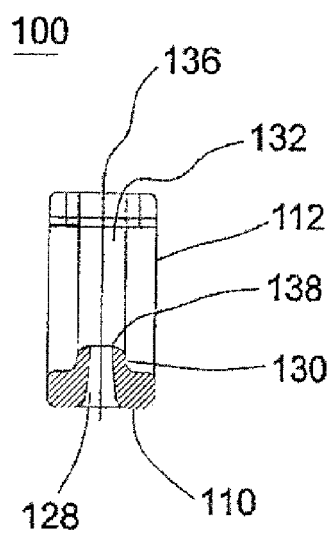
Fig. 2
Fig. 3
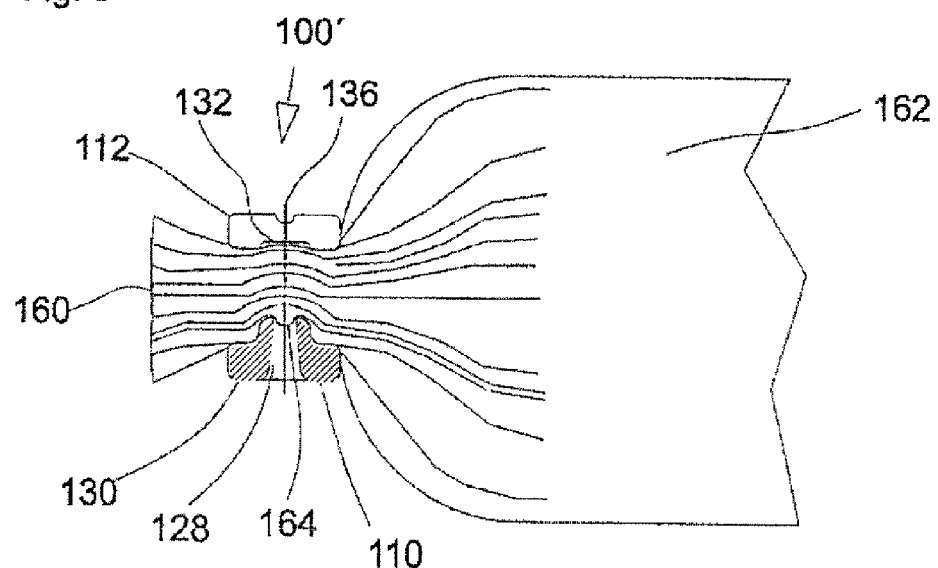

US 8,122,571 B2

CLOSURE CLIP AND PROCESS FOR THE PRODUCTION THEREOF

BACKGROUND OF THE INVENTION

The invention concerns a closure clip and a process for the production of closure clips of strip-form or wire-form material for closing tubular or bag-like packagings, wherein a substantially wave-form profile with successive first and second apex points is stamped along the strip-form or wire-form material. The first apex point forms a clip bottom, flanks respectively adjoining the first apex point on each side thereof form clip limbs which are bent over in a U-shape and the second apex point, with respect to the U-shape, forms outwardly bent-over limb ends at which two adjacent closure clips are separably connected. The invention further concerns a stamping tool for the production of closure clips in accordance with such a process.

Closure clips of that kind are known for example from DE 3 148 757 A1, EP 0 337 301 A1 or EP 0 738 662 A1. Those closure clips (also referred to as clips) are used to close tubular or bag-shaped packagings filled with liquid to viscous-pasty or (in part) granular content, sausage cases or artificial cases, at one or both ends thereof. For that purpose, the clips, typically made from an aluminum wire extrusion, are pre-bent in a U-shape in a clip machine, as described above, and are fed to a first closure tool of the clip machine, the female die, in a condition of being joined together by means of connecting legs formed in the form of the bent limb ends. After the filled packaging has been constricted in portion-wise manner to form a plaited portion, for example, by means of a displacement member or by being twisted off and thus a portion (sausage) has been divided off, the foremost clip of the above-described line of clips is pressed against the plaited portion and clamped between that and the female die. Thereupon, by means of a second closure tool that moves towards the female die, the punch, the foremost clip is severed from the following line of clips in the region of the connecting leg and then closed around the plaited portion of the packaging material. In that situation, the bent limb ends are pressed against the outside of the clip limbs and bent around the plaited portion of the packaging material, the limb ends and leg portions being pressed in butting relationship against each other and are upset so that the result is a ring that compresses the plaited portion of the packaging material as closely as possible.

The endeavor was and is to develop such closure clips in such a fashion that either with the material thickness remaining the same, an always greater retaining force and resistance to slipping is achieved in order to ensure that the closure effect is as firm and tight as possible or conversely, with the same quality of closure, it is possible to make a saving in terms of material. Particularly when using plastic skins, for example of PVC, polyamide, polyester or plastic-coated fiber skins that have a relatively smooth surface, the resistance to slipping is a major requirement.

For that purpose DE 3 148 757 A1 proposes, for example, arranging a reinforcing bead that is disposed centrally with respect to the width of the strip of material, in the region of the clip bottom and the arcuate connecting portions provided at the transition to the clip limbs. The reinforcing bead increases in particular the resistance of the closure clip to its being bent open.

EP 0 738 622 A1 proposes a different route, whereby the closure clips, on the inside, have one or more grooves in the longitudinal direction of the strip of material in order to reduce the risk of the clips slipping off. EP 0 337 301 A1, along the same line, further discloses closure clips that on the inside of the clip limbs and also on the clip bottom have a plurality of grooves that substantially provide surface coverage and are arranged in mutually crossing relationship. The knurled patterns produced in that way have a higher level of surface roughness in relation to the longitudinal grooves and further reduce the risk of slipping off.

SUMMARY OF THE INVENTION

An object of the present invention is to further improve the retaining force in relation to the known closure clips and in particular to further increase the resistance to slipping, using simple means.

In the case of a process of the kind set forth in the opening part of this specification, that object may be attained in that the strip-form or wire-form material is pierced inwardly, with respect to the U-shape, that is to say in the direction of the clip limbs.

In that way, the closure clip acquires an opening or aperture therethrough with a thrown-up raised material portion on its inside towards the limbs. The raised material portion provides a stiffening effect and thus an increased level of flexural strength as the thickness of material (at least partially) increases in the plane of the clip as defined by the U-shape. At the same time, the pressure loading of the closure clip against the plaited packaging material portion enclosed thereby is increased in point fashion and thus the adhesion of the clip to the plaited portion is improved in comparison with a flat clip inside.

The opening through the clip may also include a raised material portion with a bun is preferably formed on the inside of the closure clip, which faces towards the limbs. That means that the point pressure loading and thus the static friction of the closure clip are further increased. The burr formation is harmless in particular in relation to packaging materials that afford a high level of resistance to tearing.

Preferably, the process provides that the strip-form or wire-form material is pierced approximately centrally in the region of the clip bottom.

The closure clip thus retains its symmetry. That ensures a stable deformation process during the closure operation without tilting moments. The opening through the clip or a recessed configuration in opposite relationship to the raised material portion in the outside of the clip bottom can further be used to center the clip in the female die and to secure it to prevent it from turning or tilting during the closure operation by virtue of the die being provided with a corresponding projection that engages into the recessed configuration in the closure clip when it is fitted into the die.

In the process according to the invention, the operation of piercing the strip-form or wire-form material is preferably effected during the operation of stamping the wave-form profile.

In that way, the working steps of stamping a substantially wave-form profile on the one hand and forming a raised material portion or an opening through the clip on the other hand are performed in a common working step with the same tool. That fixes the position of the opening through the clip, in relation to the profile. The piercing operation is thus implemented in the form of a comparatively easy working step which is simple to perform.

The raised material portion is preferably of a hump-shaped configuration in the closure clip. That provides that the point loading on the packaging material in the closed condition of the clip is still further increased. The hump shape according to the invention can be produced by using for example a pointed bar of substantially round, oval or square cross-section for the piercing operation (bar piercing).

In accordance with a preferred development of the process, recesses are impressed in the strip-form or wire-form material in the region of the inside of the limbs of the closure clip in the longitudinal direction.

If, when a clip in the closed condition, those recesses correspond to the oppositely disposed raised material portion, the plaited material around which the clip is closed is displaced by the raised material portion into the recess and the plaited portion of material is gripped in that way.

BRIEF DESCRIPTION OF THE DRAWING FIGURES

Further objects, features and advantages of the invention are described hereinafter by means of an embodiment by way of example with reference to the drawings in which:

FIG. 1 shows a closure clip according to the invention as a plan view onto the plane of the clip, FIG. 2 shows a sectional side view of the closure clip of FIG. 1 in the plane of the clip, FIG. 3 shows a closure clip according to the invention closed around the end of a sausage, and FIG. 4 shows an embodiment of a stamping tool according to the invention for the production of the closure clip.

DETAILED DESCRIPTION

The closure clip 100 according to the invention as shown in FIG. 1 has a clip bottom 110 and two clip limbs 112, 114 that are bent over in a U-shape on both sides of the clip bottom 110. The limb ends 116, 118 are bent over outwardly and on their underside have recessed impressions 120, 122 that represent a desired bend location and which, when the clips are closed, allow the limb ends to be bent over more sharply. Centrally, the clip bottom 110 has a straight portion that is adjoined by arcuate connecting portions 124, 126 at the transition to the limbs 112, 114. The straight portion serves to provide that the clip 100 when fitted into a female closure die does not tend to twist or tilt by virtue of forces which possibly non-uniformly act at the limb ends.

In the case of the production process according to the invention the closure clip is preferably pierced during the operation of stamping the wave-form profile by means of a mandrel bar, from the outside, with respect to the U-shape. That results in an opening 128 through the clip and a raised material portion 130 that is thrown on the inside of the closure clip. That raised material portion 130 is of a substantially hump-shaped configuration so that it provides for a point loading on the plaited portion of the packaging material that is closed by the clip.

Stabilization and/or centering of the closure clip in the female die in the closure operation is further enhanced by the opening 128 according to the invention if a corresponding projection is provided on the die, which in the inserted condition of the clip at least initially engages into the opening through the clip.

FIG. 1 further indicates an adjacent closure clip 150 that adjoins the closure clip 100 at 154 and is joined to the limb end 118 of the closure clip 100, with one of its limb ends also bent over outwardly. The connecting leg 152 formed in that way is severed upon or immediately prior to the closure operation by a shearing tool on the punch that approaches the female die from above.

On the inside, the clip limbs 112, 114 have recesses 132, 134 that are impressed centrally with respect to the plane 136 of the clip and are thus disposed in opposite relationship to the raised material portion 130 in the closed condition of the clip, see the sectional views in FIG. 2 and FIG. 3.

In the closed condition the closure clip 100' embraces a plaited portion 160 of the packaging material of the divided and packaged portion (sausage) 162 and holds it fast in the manner shown in FIG. 3. It is possible to clearly see therefrom, how the projection formed by the raised material portion 130 presses into the plaited portion 160 in point form and thus gathers it still more greatly in the plane of the clip. Furthermore the packaging material on the opposite side is urged into the recesses 132, 134 in the clip limbs 112, 114. That provides for an additional clamping effect and increases the resistance to the clip closed around the plaited portion from slipping off.

The resistance to the clip slipping off is further increased by the opening 128, wherein packaging material is urged into the aperture thereof on the inside of the clip by virtue of the compression of the plaited portion 160 and forms a projection 164.

Finally the resistance to the clip slipping off can be still further increased by the bun formation on the inside of the opening 128 being enhanced. A sharp burr 138 at the inner edge of the opening 128 increases the (point) pressure loading on the plaited portion 160 and thus increases the friction between the closed clip 100' and the packaging material plaited portion 160. The magnitude of burr formation depends on the choice of the packaging material and in particular its resistance to tearing and cutting.

FIG. 4 shows an embodiment of a stamping tool 200 according to the invention for the production of the closure clips 100, 100'. The stamping tool 200 comprises an upper tool or punch 210 and a lower tool or female die 212. The upper tool 210 is reversibly displaceable in a vertical direction with respect to the lower tool 212. It will be appreciated that the lower tool 212 can also be displaceable with respect to the upper tool 210 or the upper and bottom tools 210, 212 can be displaceable relative to each other. In the description hereinafter it is assumed that only the upper tool 210 is displaced.

Both the upper tool and the lower tool 210, 212 have a total of three working or stamping tool portions 210a, 212a and 210b, 212b and 210c, 212c. The three stamping tool portions 210a, 212a and 210b, 212b and 210c, 212c are arranged at least equidistantly relative to each other in a horizontal orientation, that is to say in perpendicular relationship to the direction of displacement of the upper tool 210.

Each of the stamping tool portions 210a, 212a and 210b, 212b and 210c, 212c in turn comprises an upper tool or punch 210a, 210b, 210c and a respective lower tool or female die 212a, 212b, 212c. The three stamping tool portions 210a, 212a and 210b, 212b and 210c, 212c each serve for a respective working step that occur in succession in order to produce a closure clip 100, 100' according to the invention from a flat strip material BM that is fed in FIG. 4 from the right by means of an advance device (not further shown).

The first stamping tool portion 210a, 212a produces a basic shape in respect of the closure clip 100, 100' by the punch 210a moving into the female die 212a and in so doing imparting to the corresponding portion of the flat strip material BM the basic shape of the closure clip 100, 100' according to the invention as shown in FIG. 1.

After the upper tool 210 has been retracted, the flat strip material BM is then advanced with the advance device to such an extent that the portion of the flat strip material BM that was worked in the first stamping tool portion 210, 212 is disposed in the region of the next stamping tool portion, that is to say, the second stamping tool portion 210b, 212b, and can there be fitted into the female die 212b. An unworked portion of the flat strip material BM is now disposed over the first stamping tool portion 210a, 212b.

Thereupon the upper tool 210 can be displaced in the direction of the lower tool 212 so that the closure clip 100, 100', which was pre-shaped in the first stamping tool portion 210a, 212a, experiences further working or deformation. In particular in that case, the impressions 120, 122 at the upper end of the closure clip 100, 100' and the recesses 132, 134 are then shaped. At the same time, at the flat strip material BM that extends towards the right, the basic shape of a further closure clip 100, 100' is again produced in the first stamping tool portion 210a, 212a.

After the upper tool 210 has been moved away from or lifted off the lower tool 212, the flat strip material BM, after removal from the female dies 212a, 212b, is further displaced towards the left in such a way that the closure clip 100, 100' that has been worked in the second stamping tool portion 210b, 212b can be arranged in the third stamping tool portion 210c, 212c and the closure clip 100, 100' that was worked in the first stamping tool portion 210a, 212a can be arranged in the second stamping tool portion 210b, 212b. In addition, a further unworked portion of the flat strip material is disposed in the region of the first stamping tool 210a, 212a. In the downward movement of the upper tool 210, in the first stamping tool portion 210a, 212a, the basic shape of a closure clip 100, 100' is produced from the unworked portion of the flat strip material BM, the basic shape of a closure clip 100, 100' produced in the first stamping tool portion 210a, 212a in the preceding working step is produced in the above-described manner in the second stamping tool portion 210b, 212b and the closure clip 100, 100'produced in the second stamping tool portion 210b, 212b in the preceding working step is further worked in the third stamping tool portion 210c, 212c.

In particular, the raised material portion 130 and the opening 128 are now produced in the third stamping tool portion 210c, 212c in the clip bottom 110. The opening 128 is produced with a raised portion 212d that is disposed at the bottom of the female die 212c and the shape of which is matched to the opening 128 to be produced. Provided in the punch 210c of the third stamping tool portion 210c, 212c is a corresponding recess 210d, which in the illustrated embodiment, extends into a through opening (not identified in greater detail) in the upper tool 210. That opening serves, inter alia, to be able to remove lumps of material that have been caught in the recess 210d of the punch 210c of the third stamping tool portion 210c, 212c.

After a finished portion of the flat strip material BM has left the third stamping tool portion 210c, 212c, it can be cut off as a finished closure clip 100, 100' by means of a cutting device (also not shown in greater detail).

The invention claimed is:

1. A closure clip for the closure of tubular or bag packagings comprising:
    a clip bottom having an aperture therethrough with a raised material portion on an inside thereof, the aperture extending through the raised material,
    two clip limbs bent in a U-shape extending from the clip bottom, wherein the clip bottom is intermediate the clip limbs,
    a limb end extending outwardly from a free end of each clip limb and forming a part of a separable connecting leg in relation to and separable from an adjacent closure clip.

2. A closure clip as set forth in claim 1 wherein the aperture with the raised material portion is positioned approximately centrally in the region of the clip bottom.

3. A closure clip as set forth in claim 1 wherein the raised material portion has a substantially humped configuration.

4. A closure clip as set forth in claim 1 wherein the closure clip has recesses on the inside of the clip limb in a longitudinal direction to provided for additional clamping effect.

5. A closure clip as set forth in claim 1 wherein the closure clip comprises one of a strip-form material and a wire-form material.

6. A closure clip as set forth in claim 1 wherein the aperture with the raised material portion has a burr thereon.

* * * * *